US011485199B2

(12) United States Patent
Kusunoki et al.

(10) Patent No.: US 11,485,199 B2
(45) Date of Patent: Nov. 1, 2022

(54) VEHICLE SUNSHADE DEVICE AND VEHICLE DOOR STRUCTURE

(71) Applicant: NHK SPRING CO., LTD., Yokohama (JP)

(72) Inventors: Arata Kusunoki, Yokohama (JP); Takero Aoki, Yokohama (JP); Takuya Okumura, Yokohama (JP)

(73) Assignee: NHK SPRING CO., LTD., Yokohama (JP)

( * ) Notice: Subject to any disclaimer, the term of this patent is extended or adjusted under 35 U.S.C. 154(b) by 14 days.

(21) Appl. No.: 17/093,779

(22) Filed: Nov. 10, 2020

(65) Prior Publication Data

US 2021/0146758 A1   May 20, 2021

(30) Foreign Application Priority Data

Nov. 15, 2019   (JP) .............................. JP2019-207513

(51) Int. Cl.
   B60J 1/20   (2006.01)
(52) U.S. Cl.
   CPC ........... B60J 1/2038 (2013.01); B60J 1/2063 (2013.01)
(58) Field of Classification Search
   CPC ...... B60J 1/2044; B60J 1/2063; B60J 1/2086; B60J 1/2075; B60J 1/208; B60J 1/2083
   USPC .............................. 296/97.8, 152; 160/DIG. 2
   See application file for complete search history.

(56) References Cited

U.S. PATENT DOCUMENTS

2007/0262606 A1 * 11/2007 Schnoblen ............. B60J 1/2047
                                                    296/143

FOREIGN PATENT DOCUMENTS

| DE | 10064513 A1 * | 8/2001 | ............ B60J 1/2047 |
| DE | 102015200050 A1 * | 7/2016 | ............ B60J 1/2044 |
| DE | 202016003779 U1 * | 7/2016 | ............ B60J 1/2044 |
| FR | 2903347 A1 * | 1/2008 | ............ B60J 1/2063 |
| JP | A2014-159183 | 9/2014 | |
| WO | WO-2011062022 A1 * | 5/2011 | ............ B60J 1/2086 |
| WO | WO-2013150879 A1 * | 10/2013 | ............ B60J 1/2086 |
| WO | WO-2014088022 A1 * | 6/2014 | ............ B60J 1/2063 |

OTHER PUBLICATIONS

Machine translation of DE 2015200050.*
Machine translation of DE 10064513.*

* cited by examiner

*Primary Examiner* — D Glenn Dayoan
*Assistant Examiner* — Kevin P Weldon
(74) *Attorney, Agent, or Firm* — Dority & Manning, P.A.

(57) ABSTRACT

A vehicle sunshade device including: a sunshade configured to block at least a portion of light entering a vehicle cabin, by being disposed along a door glass of a vehicle; a knob attached to the sunshade; and a case configured to internally stow the sunshade, such that stowing of the sunshade is complete in a state in which the knob contacts the case.

7 Claims, 10 Drawing Sheets

FIG.10

VEHICLE SUNSHADE DEVICE AND VEHICLE DOOR STRUCTURE

CROSS-REFERENCE TO RELATED APPLICATION

This application is based on and claims priority under 35 USC 119 from Japanese Patent Application No. 2019-207513 filed on Nov. 15, 2019, the disclosure of which is incorporated by reference herein.

BACKGROUND

Technical Field

The present disclosure relates to a vehicle sunshade device and a vehicle door structure.

Related Art

Japanese Patent Application Laid-Open (JP-A) No. 2014-159183 discloses a vehicle sunshade device provided to a side door of a vehicle. The vehicle sunshade device described in this document includes a take-up device provided inside a door trim of the side door, and a sunshade taken up onto the take-up device. The sunshade is pulled out from the take-up device to dispose the sunshade along door glass of the side door. A knob is attached to the sunshade for an occupant inside the vehicle cabin to grip. This knob contacts the door trim in a state in which the majority of the sunshade has been taken up on the take-up device, namely in a stowed state of the sunshade. When the occupant inside the vehicle cabin grips the knob and moves the knob toward an upper side, the sunshade can be pulled out from the take-up device.

In a configuration in which the knob contacts a vehicle interior styling member such as a door trim in a stowed state of the sunshade, it is conceivable that the vehicle interior styling member might be pressed by the knob, and that the vehicle interior styling member might locally deform as a result.

SUMMARY

In consideration of the above circumstances, an object of the present disclosure is to obtain a vehicle sunshade device and a vehicle door structure capable of suppressing local deformation of a vehicle interior styling member by a knob that is gripped in order to pull out the sunshade.

A vehicle sunshade device of a first aspect of the present disclosure includes a sunshade configured to block at least a portion of light entering a vehicle cabin by being disposed along a door glass of a vehicle, a knob attached to the sunshade, and a case configured to internally stow the sunshade, such that stowing of the sunshade is complete in a state in which the knob contacts the case.

In the vehicle sunshade device of the first aspect of the present disclosure, an occupant of the vehicle grips the knob and pulls the sunshade out from the case to dispose the sunshade along the door glass of the vehicle. Note that the stowing of the sunshade inside the case is complete in the state in which the knob contacts the case. Making the configuration such that the stowing of the sunshade inside the case is complete in a state in which the knob does not contact any vehicle interior styling member enables local deformation of the vehicle interior styling by the knob to be suppressed.

A vehicle sunshade device of a second aspect of the present disclosure is the vehicle sunshade device of the first aspect, wherein the case is formed with a depression in which to dispose the knob, and the stowing of the sunshade inside the case is complete in a state in which the knob has been disposed inside the depression.

In the vehicle sunshade device of the second aspect of the present disclosure, the stowing of the sunshade inside the case is complete in the state in which the knob has been disposed inside the depression formed in the case. This configuration enables the amount by which the knob projects toward the vehicle cabin inner side in the stowed state of the sunshade inside the case to be reduced.

A vehicle sunshade device of a third aspect of the present disclosure is the vehicle sunshade device of the second aspect, wherein the knob is provided with a grip to pull the sunshade out from the case, and when the knob is disposed inside the depression, the grip is capable of being disposed outside the depression by operating a portion of the knob.

In the vehicle sunshade device of the third aspect of the present disclosure, when an occupant of the vehicle operates a portion of the knob disposed inside the depression, the grip of the knob is disposed outside the depression formed in the case. The occupant of the vehicle is able to easily grip the grip of the knob in this state.

A vehicle sunshade device of a fourth aspect of the present disclosure is the vehicle sunshade device of any one of the first aspect to the third aspect, further including a double axis support member including a first shaft portion pivotably supported by the knob and a second shaft portion disposed parallel with the first shaft portion and pivotably supported on the sunshade side.

In the vehicle sunshade device of the fourth aspect of the present disclosure, pivoting the knob about the first shaft portion of the double axis support member allows the knob to be displaced with respect to the sunshade. In addition, pivoting the double axis support member about the second shaft portion also allows the knob to be displaced with respect to the sunshade. Such a configuration in which the knob is attached to the sunshade through the double axis support member enables adjustment ranges of the position and orientation of the knob with respect to the sunshade to be broadened.

A vehicle sunshade device of a fifth aspect of the present disclosure is the vehicle sunshade device of the fourth aspect, wherein the double axis support member includes a pair of connection portions respectively bent so as to extend from one axial direction side end portion and another axial direction side end portion of the first shaft portion, and a pair of the second shaft portions respectively bent from opposite sides of the pair of connection portions to the first shaft portion so as to extend toward the one axial direction side and the other axial direction side of the first shaft portion. The double axis support member has a two-part that is divided structure divided about an axial direction intermediate portion of the first shaft portion.

Were configuration to be made such that the double axis support member is not divided about the axial direction intermediate portion of the first shaft portion, it might be necessary to support the first shaft portion when forming the bend between the one axial direction side end portion of the first shaft portion and one of the connection portions, and forming the bend between the other axial direction side end portion of the first shaft portion and the other connection portion. As a result, it becomes necessary to set the length of the first shaft portion to a dimension corresponding to the dimensions of a jig used to support the first shaft portion, and so it might be impossible to shorten the length of the first shaft portion. However, in a configuration in which the double axis support member has a two-part divided structure divided about the axial direction intermediate portion of the first shaft portion as in the vehicle sunshade device of the fifth aspect, an end side of the first shaft portion can be supported by a jig, enabling the first shaft portion to be set with a shorter length.

A vehicle door structure of a sixth aspect of the present disclosure includes: the vehicle sunshade device of any one of the first aspect to the fifth aspect, wherein the knob is attached to the sunshade through an upper plate attached to an end portion of the sunshade; and a door trim including a plate restricting portion configured to suppress displacement of the upper plate due to the upper plate contacting the door trim in a state in which the stowing of the sunshade inside the case has been completed.

The vehicle door structure of the sixth aspect of the present disclosure includes the vehicle sunshade device of any one of the first aspect to the fifth aspect, thereby enabling local deformation of the door trim by the knob to be suppressed. Moreover, the upper plate is configured to contact the plate restricting portion of the door trim in the state in which the stowing of the sunshade inside the case has been completed, thereby enabling displacement of the upper plate to be suppressed.

The vehicle sunshade device and the vehicle door structure according to the present disclosure exhibit an excellent advantageous effect of enabling local deformation of a vehicle interior styling member by the knob that is gripped in order to pull out the sunshade to be suppressed.

BRIEF DESCRIPTION OF THE DRAWINGS

Exemplary embodiments of the present disclosure will be described in detail based on the following figures, wherein.

DETAILED DESCRIPTION

Explanation follows regarding a vehicle door structure and a vehicle sunshade device 12 according to an exemplary embodiment of the present disclosure, with reference to FIG. 1 to FIG. 10.

Figure 1:
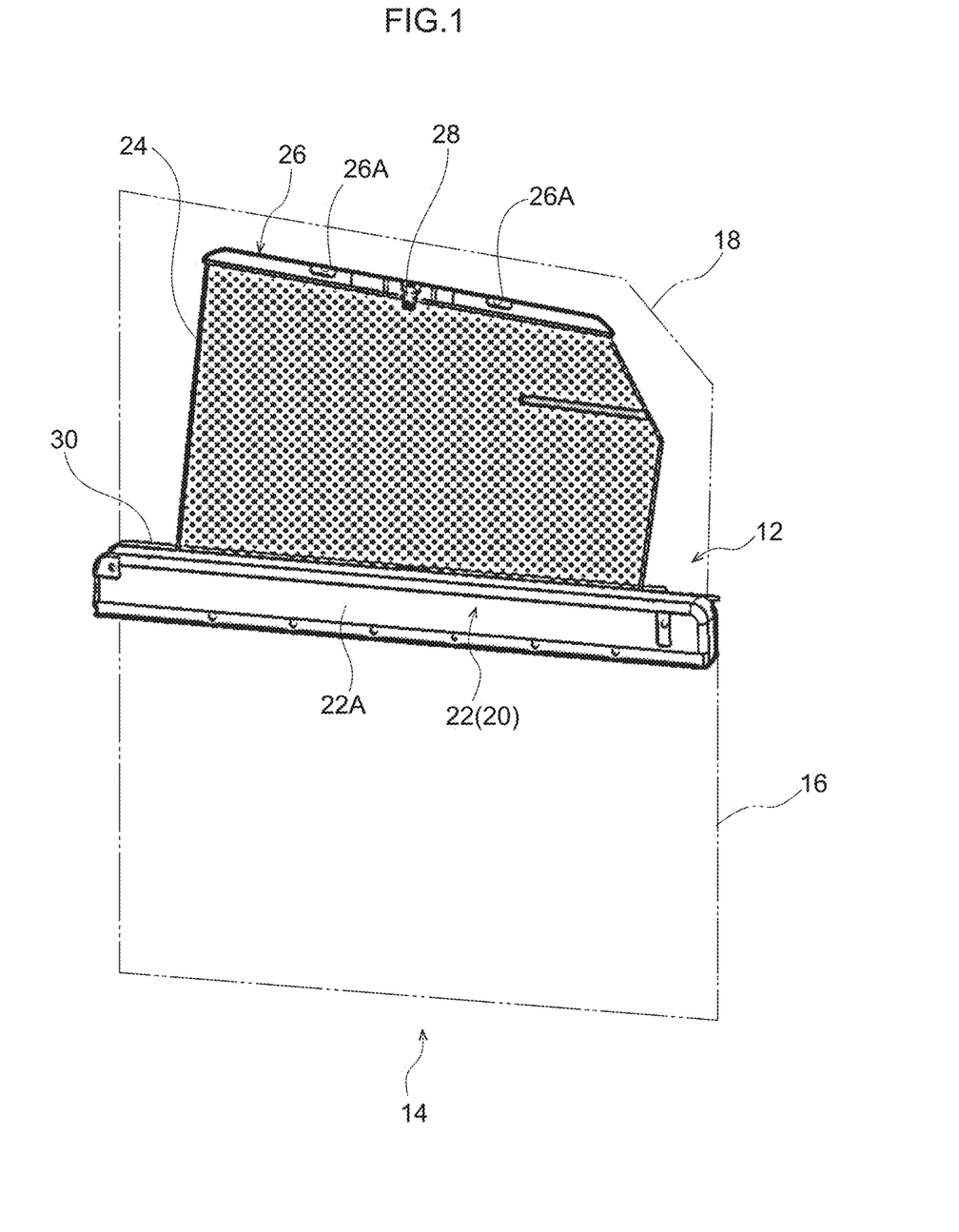
FIG. 1 is a perspective view illustrating a side door of a vehicle and a vehicle sunshade device in a state in which a sunshade has been pulled out.

As illustrated in FIG. 1, a vehicle door structure of the present exemplary embodiment is applied to a side door 14 that opens up and closes off a side door opening formed in a side section of a vehicle. The side door 14 includes a door body 16 configured by joining together a door outer panel and a door inner panel, a door glass 18 supported by the door body 16, a door trim 20 attached to a vehicle cabin inner side of the door body 16, and the vehicle sunshade device 12 fixed to the door body 16. Note that FIG. 1 illustrates only an upper side portion of the door trim 20 (a portion corresponding to the vehicle sunshade device 12). In the following explanation, the portion of the door trim 20 corresponding to the vehicle sunshade device 12 is referred to as the door trim upper 22.

Figure 2:
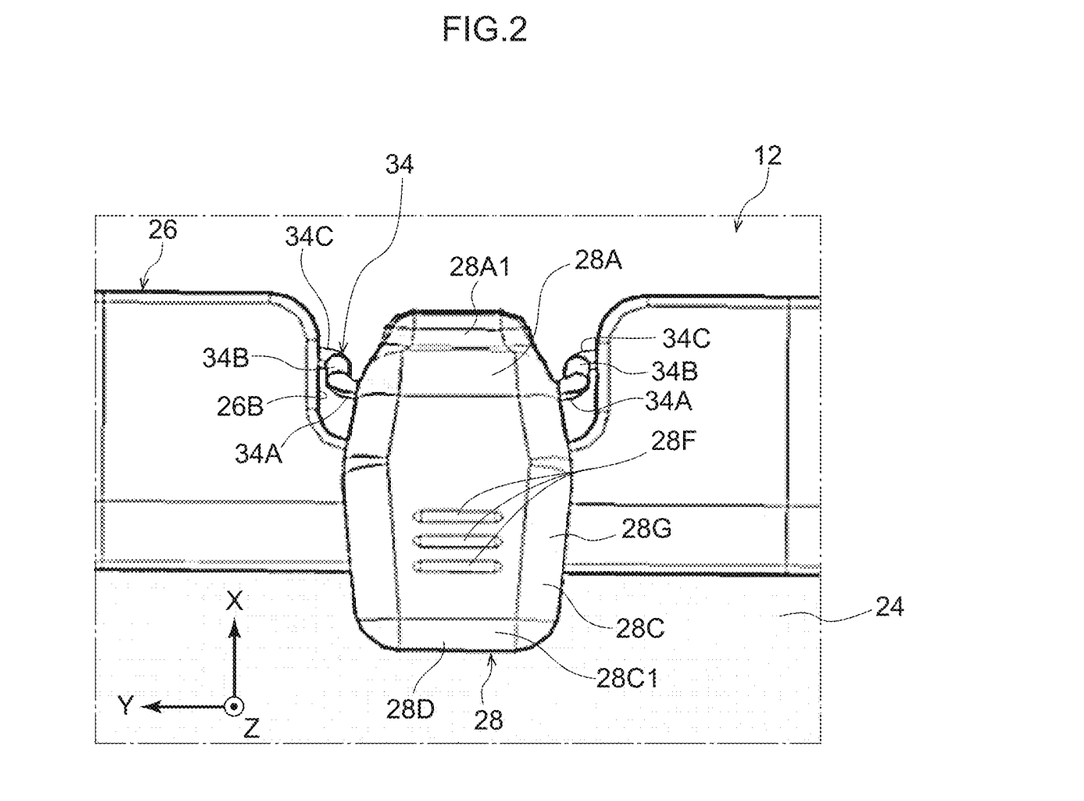
FIG. 2 is an enlarged side view illustrating a knob in a state in which a sunshade has been pulled out.
Figure 3:
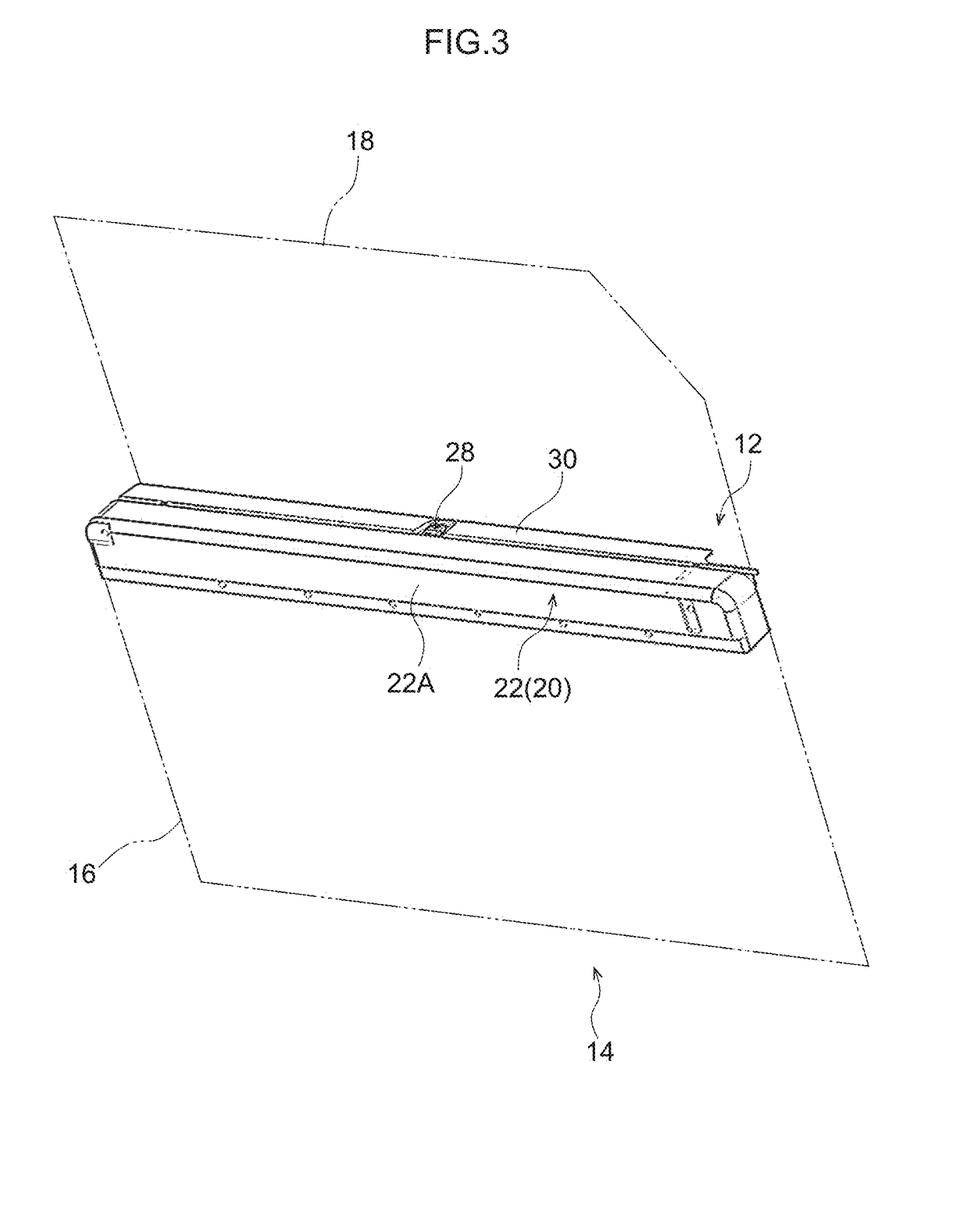
FIG. 3 is a perspective view illustrating a side door of a vehicle and a vehicle sunshade device in a state in which a sunshade has been stowed.
Figure 4:
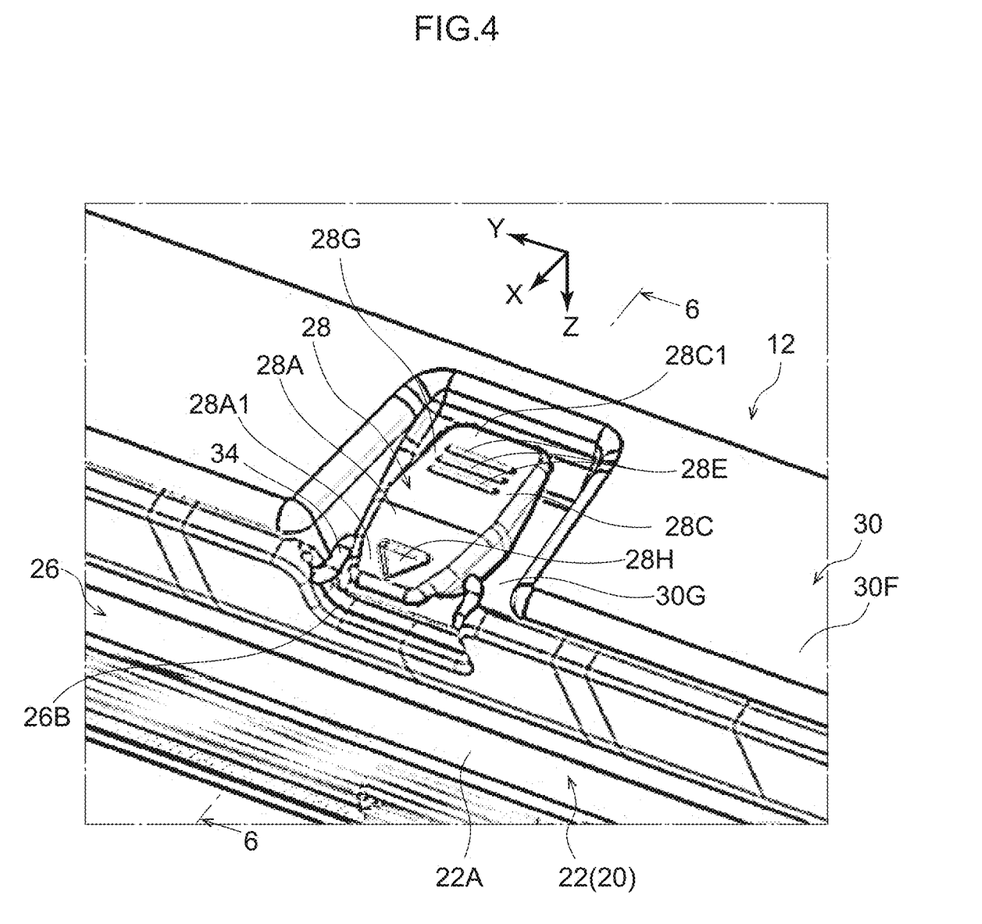
FIG. 4 is an enlarged perspective view illustrating a knob in a state in which a sunshade has been stowed.
Figure 5:
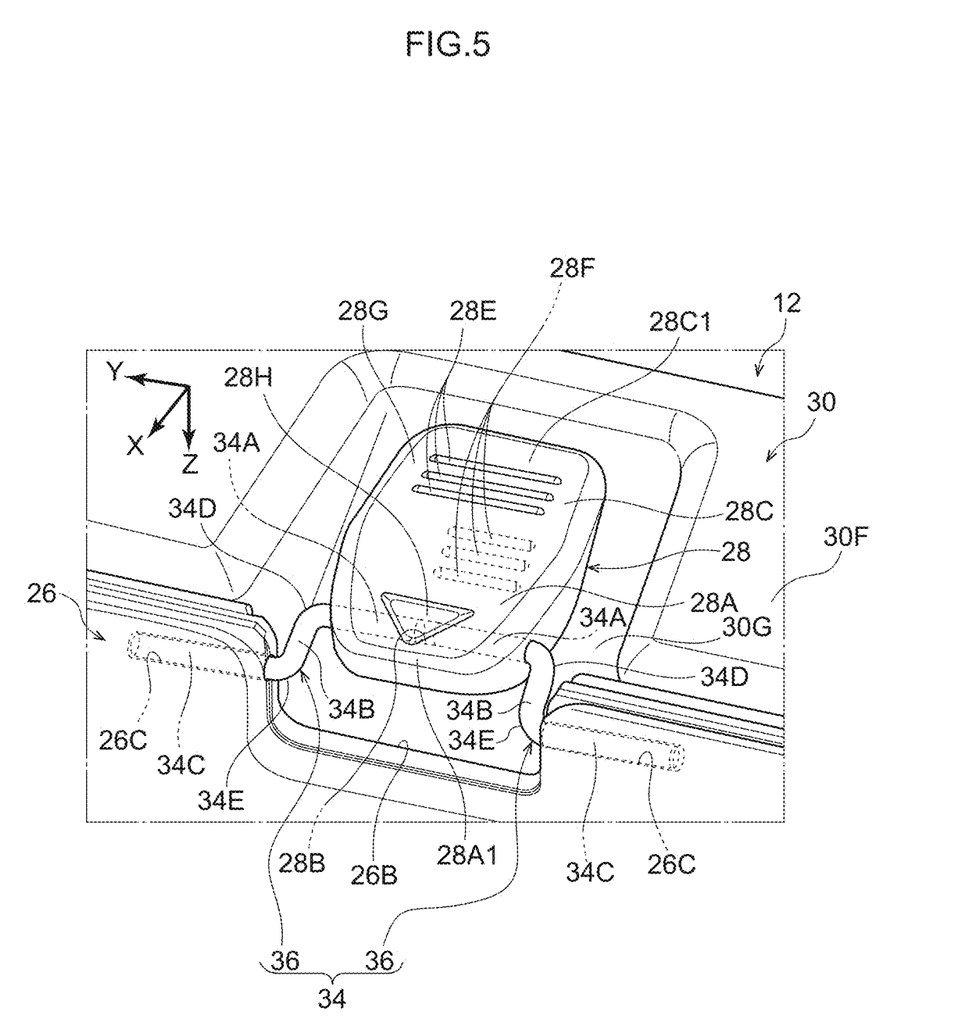
FIG. 5 is an enlarged perspective view illustrating a knob in a state in which a sunshade has been stowed, with a portion of a wire engaged with the knob and a portion of the wire engaged with an upper plate illustrated by dashed lines.
Figure 6:
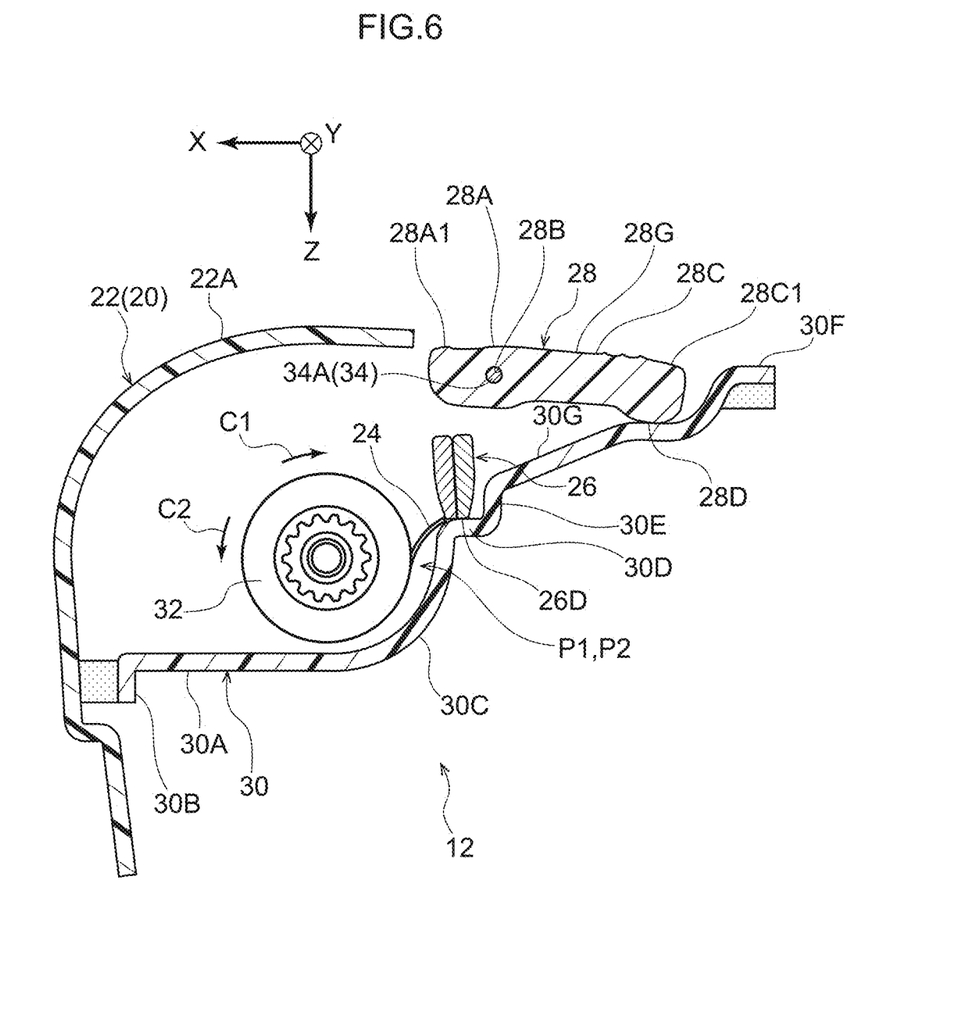
FIG. 6 is an enlarged cross-section illustrating a door trim, a vehicle sunshade device, and the like as sectioned along line 6-6 in FIG. 4.

As illustrated in FIG. 1 to FIG. 5, the vehicle sunshade device 12 includes a sunshade 24 configured to block a portion of light entering the vehicle cabin by being disposed along the door glass 18 of the vehicle, an upper plate 26 attached to the sunshade 24, and a knob 28 attached to the sunshade 24 through the upper plate 26. As illustrated in FIG. 4 and FIG. 6, the vehicle sunshade device 12 also includes a case 30 for stowing the sunshade 24, and a take-up section 32 supported by the case 30 so as to take up the sunshade 24.

For example, the sunshade 24 is formed by cutting a fabric member into a predetermined shape. The sunshade 24 allows a portion of the light entering the vehicle cabin through the door glass 18 to be guided through plural holes (for example gaps between fibers) formed in the sunshade 24, and is capable of blocking the majority of the light entering the vehicle cabin through the door glass 18. Note that alternatively, a member capable of blocking all of the light entering the vehicle cabin through the door glass 18 may be employed to form the sunshade.

As illustrated in FIG. 1, FIG. 2, and FIG. 4, the upper plate 26 is formed in a rectangular plate shape using a resin material. The upper plate 26 is fixed to an upper edge of the sunshade 24 (an upper side edge when in a state disposed along the door glass 18) in a state in which the upper edge of the sunshade 24 has been tucked inside the upper plate 26.

As illustrated in FIG. 1, the upper plate 26 is formed with a pair of anchor holes 26A arranged spaced apart from each other in the length direction of the upper plate 26. The pair of anchor holes 26A in the upper plate 26 are anchored to non-illustrated anchor portions provided to the side door 14 so as to retain the sunshade 24 in a state disposed along the door glass 18. As illustrated in FIG. 2, a length direction central portion of the upper plate 26 is formed with a knob-anchoring recess 26B opening toward the opposite side to the sunshade 24. The knob 28 is anchored to the knob-anchoring recess 26B through a wire 34 that is anchored to the knob-anchoring recess 26B. As illustrated in FIG. 5, the upper plate 26 is also formed with a pair of second wire insertion holes 26C, one side of each of which opens onto the inside of the knob-anchoring recess 26B. The axial direction of the pair of second wire insertion holes 26C is aligned with the length direction of the upper plate 26, and the pair of second wire insertion holes 26C are disposed coaxially to each other.

As illustrated in FIG. 2, FIG. 4, and FIG. 5, the knob 28 is formed in a block shape using a resin material. Note that in the drawings, the arrow X, the arrow Y, and the arrow Z illustrate respective directions relative to the knob 28. Namely, the arrow X indicates one side in a length direction of the knob 28, the arrow Y indicates one side in a width direction of the knob 28, and the arrow Z indicates one side in a thickness direction of the knob 28.

One length direction side portion 28A of the knob 28 is formed with a single first wire insertion hole 28B, into which the wire 34, described later, is inserted. The first wire insertion hole 28B penetrates the knob 28 in the width direction.

A width direction dimension of the one length direction side portion 28A of the knob 28 becomes progressively smaller on progression toward the one length direction side. A width direction dimension of another length direction side portion 28C of the knob 28 becomes progressively smaller on progression toward the other length direction side. Note that in the present exemplary embodiment, as viewed along the thickness direction of the knob 28, the width direction dimensions of respective portions of the knob 28 are set such that the one length direction side portion 28A of the knob 28 has a more pointed profile than the other length direction side portion 28C.

Figure 7:
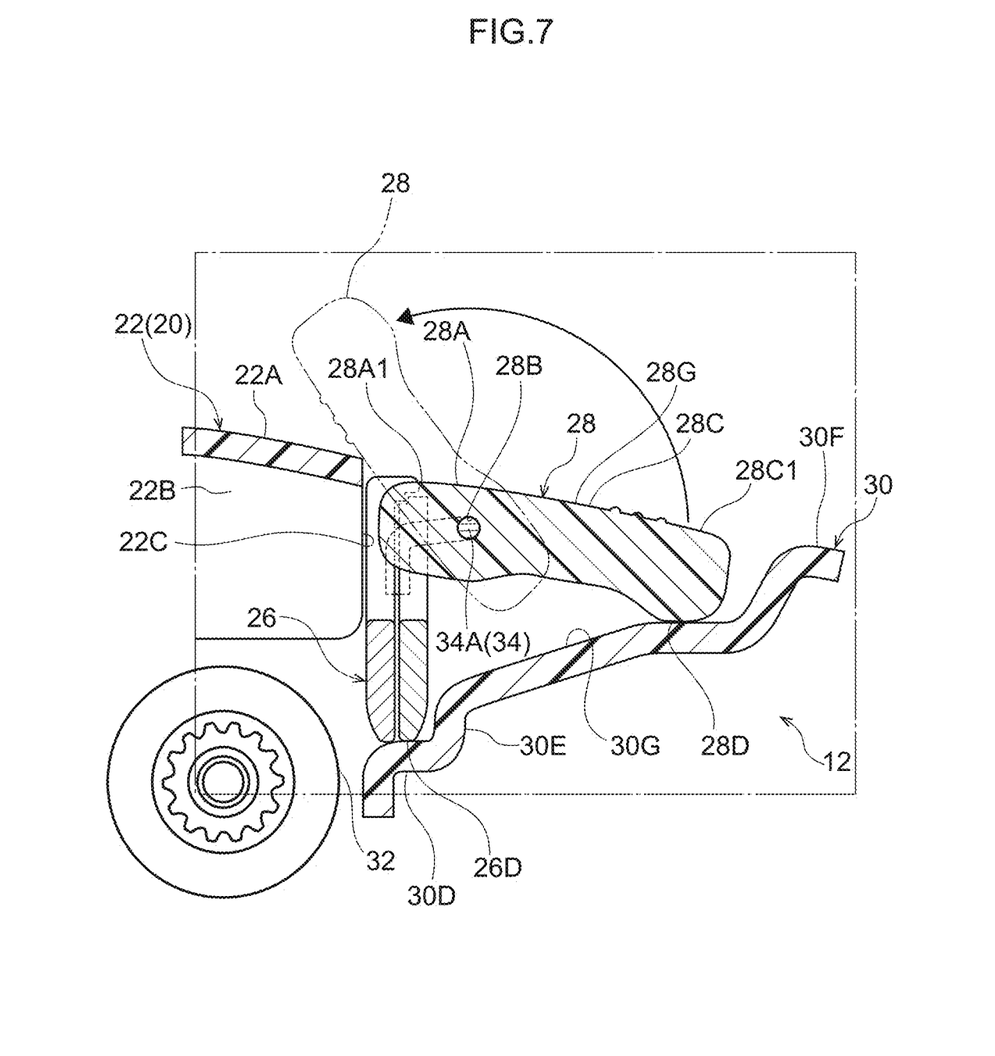
FIG. 7 is an enlarged cross-section corresponding to FIG. 6, illustrating a trajectory of a knob when lifting up the knob from a state disposed inside a stowing recess of a case.

As illustrated in FIG. 6 and FIG. 7, another length direction side end portion 28C1 of the knob 28 is formed with a contact projection 28D that projects toward one thickness direction side and that has a gently curved projection-direction leading end side face.

As illustrated in FIG. 4 and FIG. 5, another thickness direction side face of the other length direction side portion 28C of the knob 28 is formed with plural (three in the present exemplary embodiment) semicircular column shaped first projections 28E arranged spaced apart from each other in the length direction so as to project toward the other thickness direction side.

As illustrated in FIG. 2 and FIG. 5, one thickness direction side face of the other length direction side portion 28C of the knob 28 is formed with plural (three in the present exemplary embodiment) semicircular column shaped second projections 28F arranged spaced apart from each other in the length direction so as to project toward the one thickness direction side. Length direction dimensions of the second projections 28F are set to shorter dimensions than the length direction dimensions of the first projections 28E.

Note that the other length direction side portion 28C of the knob 28, namely the portion of the knob 28 formed with the first projections 28E and the second projections 28F, configures a grip 28G to be gripped by the occupant inside the vehicle cabin.

As illustrated in FIG. 4 and FIG. 5, an other thickness direction side face of one length direction side end portion 28A1 of the knob 28 is formed with a press instruction recess 28H open toward the other thickness direction side. An edge of the press instruction recess 28H is formed in a triangular shape as viewed from the other thickness direction side.

As illustrated in FIG. 5, the wire 34 serves as a double axis support member, and is for example formed by bending a thread-shaped (a circular column shape with a small external diameter) steel member that has been cut to specific dimensions. The wire 34 includes a first shaft portion 34A that is inserted into the first wire insertion hole 28B formed in the knob 28. The wire 34 also includes a pair of connection portions 34B respectively bent from one axial direction side end portion and another axial direction side end portion of the first shaft portion 34A so as to extend parallel to each other. The wire 34 also includes a pair of second shaft portions 34C respectively bent from the opposite sides of the pair of connection portions 34B to the first shaft portion 34A so as to extend toward the one axial direction side and the other axial direction side of the first shaft portion 34A. The pair of second shaft portions 34C are disposed coaxially to each other. The pair of second shaft portions 34C are also disposed running parallel to the first shaft portion 34A. The pair of second shaft portions 34C are respectively inserted into the pair of second wire insertion holes 26C formed in the upper plate 26. The wire 34 is thus capable of swinging about axial support portions configured by the pair of second wire insertion holes 26C.

Note that L-shaped bent portions formed at the boundaries between the first shaft portion 34A and the connection portions 34B are referred to as first bent portions 34D, and L-shaped bent portions formed at the boundaries between the second shaft portions 34C and the connection portions 34B are referred to as second bent portions 34E.

The wire 34 of the present exemplary embodiment has a two-part divided structure divided about an axial direction intermediate portion of the first shaft portion 34A (the center thereof in the present exemplary embodiment). The wire 34 of the present exemplary embodiment may thus be understood as a configuration including a pair of the first shaft portions 34A. The wire 34 of the present exemplary embodiment may also be understood as being configured by a pair of wire configuration members 36, each of which includes a first shaft portion 34A, a connection portion 34B, and a second shaft portion 34C. Based on this, the pair of first shaft portions 34A are respectively inserted into the first wire insertion hole 28B formed in the knob 28 from one and the other side so as to enable swinging of the knob 28 about axial support portions configured by the pair of first shaft portions 34A. Moreover, in the present exemplary embodiment, in a state in which the pair of first shaft portions 34A have been inserted into the first wire insertion hole 28B formed in the knob 28 from the one and the other side, an end of one of the first shaft portions 34A and the end of the other first shaft portion 34A are separated from each other inside the single first wire insertion hole 28B formed in the knob 28.

Figure 10:
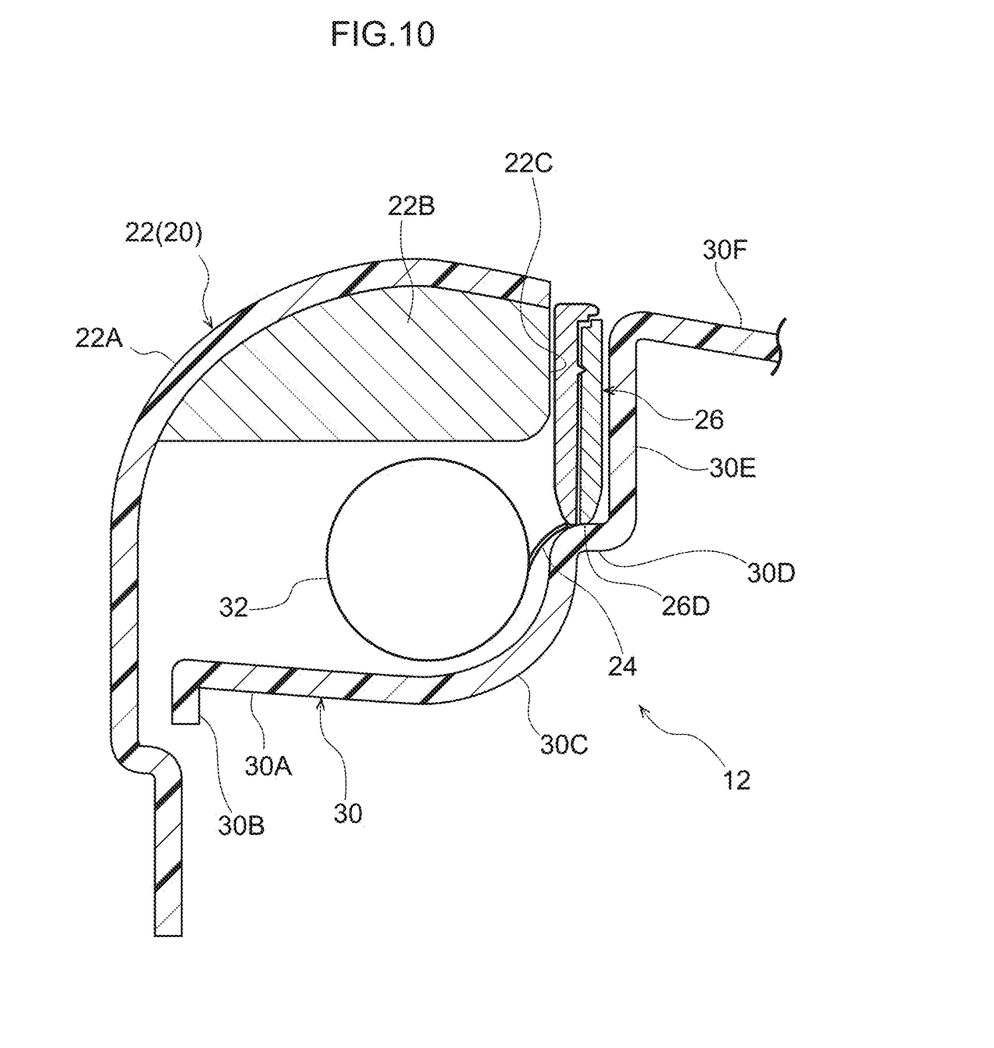
FIG. 10 is an enlarged cross-section illustrating a door trim, a vehicle sunshade device, and the like as sectioned along line 10-10 in FIG. 9.

As illustrated in FIG. 3, FIG. 4, and FIG. 6, the case 30 is formed in a box shape open toward the upper side and the vehicle cabin inner side when in a state attached to the door body 16. As illustrated in FIG. 6, FIG. 7, and FIG. 10, the case 30 includes a bottom wall portion 30A configuring a lower side portion of the case 30 as viewed in cross-section sectioned along a rotation-radial direction of the take-up section 32 supported by the case 30. A vehicle cabin inner side end portion of the bottom wall portion 30A is bent toward the lower side to configure a first flange 30B. The case 30 also includes a first curved wall portion 30C that extends in a gentle curve toward the upper side from the opposite side of the bottom wall portion 30A to the first flange 30B, and is disposed in close proximity to the take-up section 32, described later. The case 30 further includes a plate contact wall portion 30D bent from an upper end of the first curved wall portion 30C so as to extend toward the vehicle cabin outer side (the outer side of the side door 14), and an upright wall portion 30E bent from an end of the plate contact wall portion 30D on the opposite side to the first curved wall portion 30C so as to extend toward the upper side. The case 30 also includes a top wall portion 30F extending from an upper end of the upright wall portion 30E toward the vehicle cabin outer side.

Note that as illustrated in FIG. 4, FIG. 6, and FIG. 7, the top wall portion 30F and the upright wall portion 30E of the case 30 are formed with a knob placement recess 30G configured by a depression in which the knob 28 is disposed in a state in which the stowing of the sunshade 24 inside the case 30 has been completed, as described later.

As illustrated in FIG. 6 and FIG. 10, the take-up section 32 is formed in a circular tube shape or a circular column shape, and both length direction end portions of the take-up section 32 are anchored to non-illustrated shaft support holes provided in the case 30 so as to allow the take-up section 32 to rotate. An end portion on the opposite side of the sunshade 24 to aside fixed to the upper plate 26 is anchored to the take-up section 32. Rotating the take-up section 32 in a take-up direction (the arrow C1 direction) causes the sunshade 24 to be taken up onto the take-up section 32. Pulling out the sunshade 24 causes the take-up section 32 to rotate in in a pull-out direction (the arrow C2 direction). Note that in the present exemplary embodiment, when the take-up section 32 is rotated in the take-up direction, the side of the take-up section 32 located at the plate contact wall portion 30D of the case 30 configures a take-up start position P1 from which the take-up section 32 starts taking up the sunshade 24. Moreover, when the take-up section 32 is rotated in the pull-out direction, the side of the take-up section 32 located at the plate contact wall portion 30D of the case 30 configures an unroll position P2 where the sunshade 24 unrolls from the take-up section 32. The take-up section 32 is applied with a rotational bias in the take-up direction by a non-illustrated biasing member. When the take-up section 32 is rotated in the take-up direction under the biasing force of the biasing member, the sunshade 24 is taken up onto the take-up section 32. This take-up of the sunshade 24 onto the take-up section 32 is completed when the sunshade 24 has been taken up as far as a position where a lower end 26D of the upper plate 26 fixed to the sunshade 24 contacts the plate contact wall portion 30D of the case 30, thereby completing the stowing of the sunshade 24 in the case 30.

Figure 9:
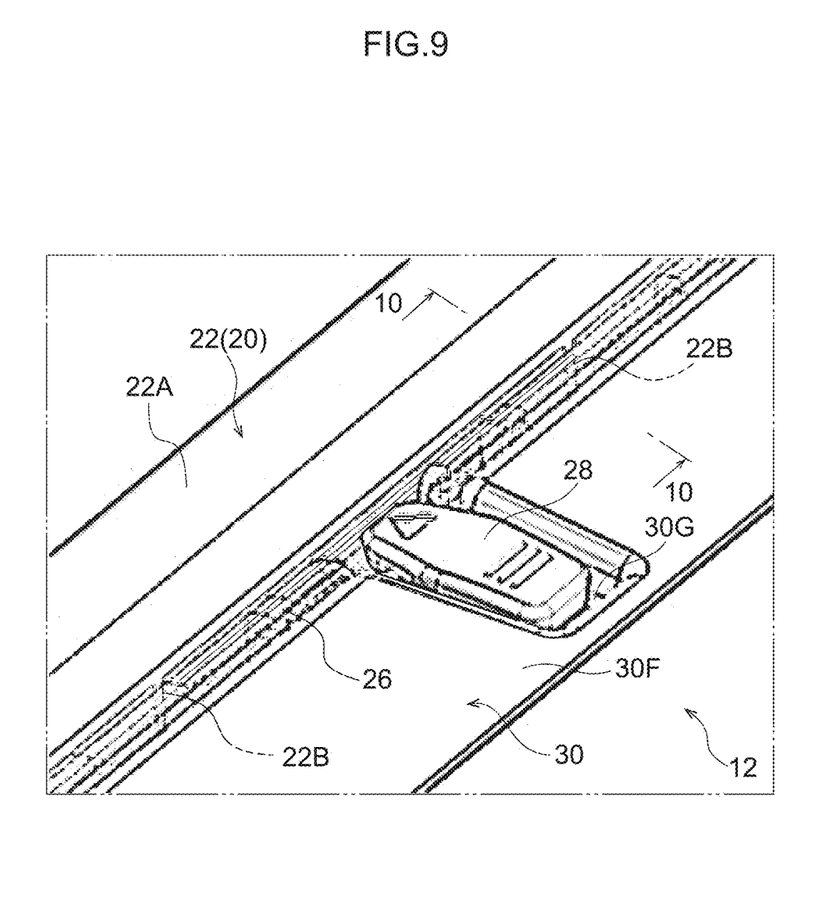
FIG. 9 is an enlarged perspective view illustrating a knob and its surroundings in a state in which a sunshade has been stowed, as viewed from the opposite side to FIG. 4.

As illustrated in FIG. 6, FIG. 9, and FIG. 10, the door trim upper 22 includes a covering portion 22A that bends with a convex profile toward the vehicle cabin inner side and that covers a portion of the case 30 that supports the take-up section 32 in a state in which the door trim upper 22 has been attached to the door body 16. A leather-style cover is joined to a vehicle cabin inner side face of the covering portion 22A.

As illustrated in FIG. 9 and FIG. 10, the door trim upper 22 also includes a pair of plate restricting ribs 22B, serving as plate restricting portions, projecting out from the covering portion 22A toward the case 30 side. The pair of plate restricting ribs 22B are arranged spaced apart from each other on either side of the knob placement recess 30G formed in the case 30. Vehicle outer side edges 22C of the pair of plate restricting ribs 22B are disposed parallel to and opposing the upright wall portion 30E of the case 30. The upper plate 26 is disposed between the upright wall portion 30E of the case 30 and the vehicle outer side edges 22C of the pair of plate restricting ribs 22B so as to suppress tilting of the upper plate 26. Namely, the upper plate 26 is disposed between the upright wall portion 30E of the case 30 and the vehicle outer side edges 22C of the pair of plate restricting ribs 22B so as to retain the upper plate 26 in a specific orientation.

Operation and Advantageous Effects of Present Exemplary Embodiment

Next, explanation follows regarding operation and advantageous effects of the present exemplary embodiment.

As illustrated in FIG. 3, FIG. 4, and FIG. 6, in a state in which an occupant inside the vehicle cabin of the vehicle provided with the side door 14 described above is not using the sunshade 24, the sunshade 24 is stowed inside the case 30 in a state taken up by the take-up section 32. In this state, the entirety of the knob 28 is disposed in the knob placement recess 30G formed in the case 30 in a state in which one thickness direction side face of the knob 28 faces toward the lower side. This enables the amount by which the knob 28 projects toward the vehicle cabin inner side in the stowed state of the sunshade 24 inside the case 30 to be reduced. Moreover, in the state in which the entirety of the knob 28 has been disposed in the knob placement recess 30G formed in the case 30, the contact projection 28D of the knob 28 contacts the bottom of the knob placement recess 30G formed in the case 30. Making the configuration such that the knob 28 contacts the case 30 in a state in which the sunshade 24 has been stowed inside the case 30 enables deformation of the door trim upper 22 due to being pressed by the knob 28 to be prevented or suppressed.

When the occupant inside the vehicle cabin wishes to use the sunshade 24, as illustrated in FIG. 4 and FIG. 7, first the occupant presses the one length direction side end portion 28A1 of the knob 28, namely the portion of the knob 28 formed with the press instruction recess 28H, toward the lower side. When this is performed, as illustrated by the double-dotted dashed lines in FIG. 7, the other length direction side portion 28C of the knob 28, namely the grip 28G of the knob 28, comes out of the knob placement recess 30G formed in the case 30 toward the upper side. This allows the occupant inside the vehicle cabin to grip the grip 28G of the knob 28.

Then, when the knob 28 is moved toward the upper side in a state in which the occupant is gripping the grip 28G of the knob 28, the sunshade 24 is pulled out from inside the case 30 as illustrated in FIG. 1. The pair of anchor holes 26A in the upper plate 26 are then anchored to the non-illustrated anchor portions provided to the side door 14. The sunshade 24 is thus retained in a state disposed along the door glass 18, thereby blocking the majority of the light entering the vehicle cabin through the door glass 18.

Figure 8:
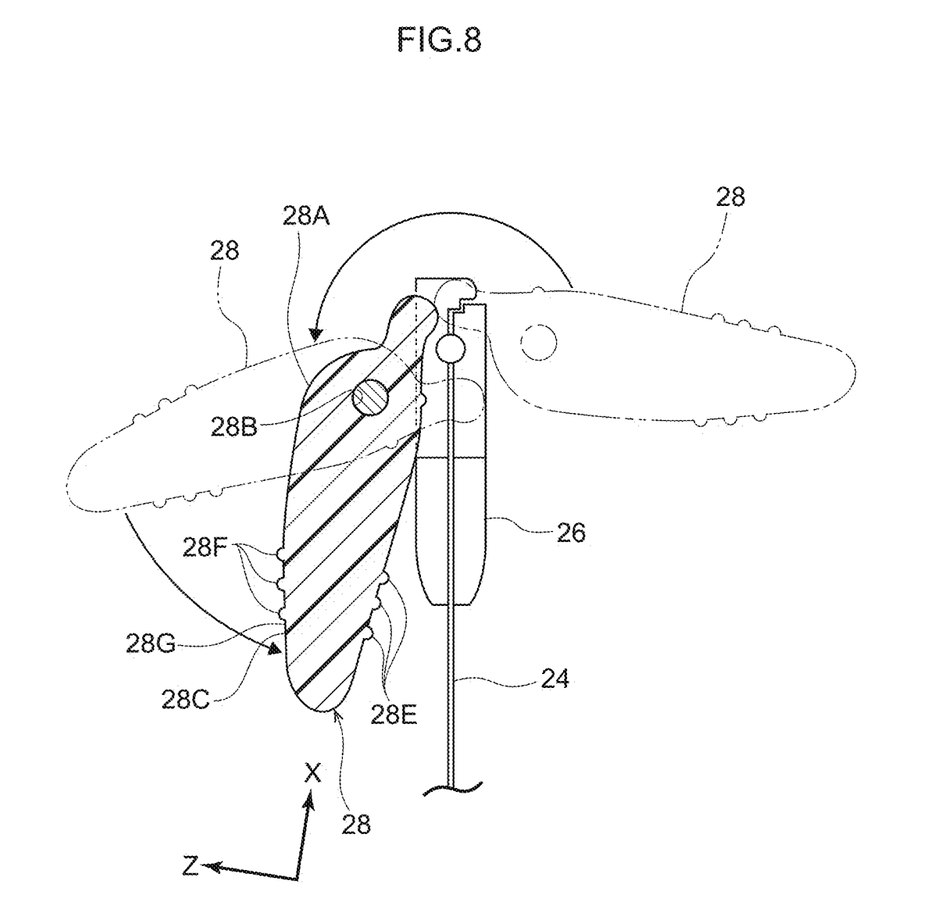
FIG. 8 is an enlarged cross-section illustrating the trajectory of a knob when disposing the knob at an in-use stowed position in a state in which a sunshade has been pulled out.

As illustrated in FIG. 8, after the pair of anchor holes 26A in the upper plate 26 have been anchored to the non-illustrated anchor portions provided to the side door 14, the knob 28 is disposed at a position where the one thickness direction side face of the knob 28 runs along the upper plate 26. This enables the amount by which the knob 28 projects toward the vehicle cabin inner side in a state in which the occupant inside the vehicle cabin is using the sunshade 24 to be reduced, as illustrated in FIG. 2 and FIG. 8. In particular, as illustrated in FIG. 5, in the present exemplary embodiment, pivoting the knob 28 about the first shaft portion 34A of the wire 34 allows the knob 28 to be displaced with respect to the upper plate 26 that is fixed to the sunshade 24. In addition, pivoting the wire 34 about the second shaft portions 34C also allows the knob 28 to be displaced with respect to the upper plate 26 that is fixed to the sunshade 24. Such a configuration, in which the knob 28 is attached to the sunshade 24 through the wire 34 that includes the first shaft portion 34A and the second shaft portions 34C, enables adjustment ranges of the position and orientation of the knob 28 with respect to the sunshade 24 (upper plate 26) to be broadened. Moreover, due to this configuration, the present exemplary embodiment enables the knob 28 to be disposed at the position illustrated in FIG. 2 and FIG. 8.

Moreover, as illustrated in FIG. 5, in the present exemplary embodiment, the wire 34 has a two-part divided structure divided about the axial direction intermediate portion of the first shaft portion 34A. However, were configuration to be made such that the wire 34 is not divided about the axial direction intermediate portion of the first shaft portion 34A, it might be necessary to support the first shaft portion 34A when forming the two first bent portions 34D to the wire 34. As a result, it becomes necessary to set the length of the first shaft portion 34A to a dimension corresponding to the dimensions of a jig used to support the first shaft portion 34A, and so it might be impossible to shorten the length of the first shaft portion 34A. However, in the configuration in which the wire 34 has a two-part divided structure divided about the axial direction intermediate portion of the first shaft portion 34A, namely in a configuration in which the wire 34 is configured by the pair of wire configuration members 36, the first shaft portions 34A configuring end portions of the wire configuration members 36 can be supported by a jig, enabling the first shaft portions 34A to be set with a shorter length. This enables an increase in size of the portion of the knob 28 supported by the first shaft portion 34A to be suppressed, and also enables an increase in size of the knob placement recess 30G of the case 30 in which the knob 28 is disposed to be suppressed. This in turn enables any detriment to the design quality of portions peripheral to the knob 28 to be suppressed.

Although explanation has been given regarding an exemplary embodiment of the present disclosure, the present disclosure is not limited by the above explanation, and obviously various other modifications may be implemented within a range not departing from the spirit of the present disclosure.

What is claimed is:

1. A vehicle sunshade device, comprising:
a sunshade configured to block at least a portion of light entering a vehicle cabin by being disposed along a door glass of a vehicle;
a knob attached to the sunshade;
a case configured to internally stow the sunshade, such that stowing of the sunshade is complete in a state in which the knob contacts the case; and
a double axis support member including a first shaft portion pivotably supported by the knob and a second shaft portion disposed parallel with the first shaft portion and pivotably supported on the sunshade, the double axis support member includes a pair of connection portions respectively bent so as to extend from one axial direction side end portion and another axial direction side end portion of the first shaft portion, and a pair of the second shaft portions respectively bent from opposite sides of the pair of connection portions to the first shaft portion so as to extend toward the one axial direction side and the other axial direction side of the first shaft portion, the double axis support member has a two-part divided structure that is divided about an axial direction intermediate portion of the first shaft portion.

2. The vehicle sunshade device of claim 1, wherein:
the case is formed with a depression in which to dispose the knob, and
the stowing of the sunshade inside the case is complete in a state in which the knob has been disposed inside the depression.

3. The vehicle sunshade device of claim 2, wherein:
the knob is provided with a grip to pull the sunshade out from the case, and
when the knob is disposed inside the depression, the grip is capable of being disposed outside the depression by operating a portion of the knob.

4. A vehicle door structure, comprising:
a sunshade configured to block at least a portion of light entering a vehicle cabin by being disposed along a door glass of a vehicle;
a knob attached to the sunshade, the knob being provided with a grip and defining an end portion;
a door trim; and
a case configured to internally stow the sunshade, the case defining a depression,
wherein stowing of the sunshade is complete in a state in which the knob contacts the case and the knob is entirely disposed inside the depression defined by the case such that local deformation of the door trim by the knob is suppressed.

5. The vehicle door structure of claim 4, wherein, when the knob is disposed inside the depression, the grip is capable of being lifted out of the depression by a user pressing the end portion of the knob.

6. The vehicle door structure of claim 4, wherein the end portion of the knob defines a press instruction recess, the end portion of the knob being opposite the grip along a length direction of the knob.

7. A vehicle door structure, comprising:
a sunshade configured to block at least a portion of light entering a vehicle cabin by being disposed along a door glass of a vehicle;
an upper plate attached to an end portion of the sunshade;
a knob attached to the sunshade by the upper plate;
a case configured to internally stow the sunshade, such that stowing of the sunshade is complete in a state in which the knob contacts the case; and
a door trim including a plate restricting portion configured to suppress displacement of the upper plate due to the upper plate contacting the door trim in the state in which the stowing of the sunshade inside the case is complete.

\* \* \* \* \*